United States Patent
Segev et al.

(10) Patent No.: US 9,204,335 B2
(45) Date of Patent: Dec. 1, 2015

(54) WIRELESS DISCOVERY USING A REDUCED TRAFFIC LOAD PROCESS

(71) Applicants: Jonathan Segev, Tel Mond (IL); Adrian P. Stephens, Cottenham (GB); Emily H. Qi, Portland, OR (US); Xiaohong X. Gong, Sunnyvale, CA (US); Minyoung Park, Portland, OR (US)

(72) Inventors: Jonathan Segev, Tel Mond (IL); Adrian P. Stephens, Cottenham (GB); Emily H. Qi, Portland, OR (US); Xiaohong X. Gong, Sunnyvale, CA (US); Minyoung Park, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 259 days.

(21) Appl. No.: 13/719,480

(22) Filed: Dec. 19, 2012

(65) Prior Publication Data

US 2013/0294232 A1 Nov. 7, 2013

Related U.S. Application Data

(60) Provisional application No. 61/641,371, filed on May 2, 2012.

(51) Int. Cl.
| | |
|---|---|
| H04J 1/16 | (2006.01) |
| H04W 28/06 | (2009.01) |
| H04W 48/16 | (2009.01) |
| H04W 48/20 | (2009.01) |

(52) U.S. Cl.
CPC .............. *H04W 28/06* (2013.01); *H04W 48/16* (2013.01); *H04W 48/20* (2013.01)

(58) Field of Classification Search
CPC .................................................... H04W 28/06
USPC ......................................................... 370/230
See application file for complete search history.

(56) References Cited

U.S. PATENT DOCUMENTS

2011/0183685 A1* 7/2011 Burton et al. ............... 455/456.1
2013/0286937 A1* 10/2013 Liu et al. ....................... 370/328

* cited by examiner

*Primary Examiner* — Shripal Khajuria
(74) *Attorney, Agent, or Firm* — Schwegman Lundberg & Woessner, P.A.

(57) ABSTRACT

Traffic load over a wireless medium due to wireless access point discovery is reduced. The wireless stations and wireless access points support wireless discovery using a reduced traffic load process. The reduced traffic load process includes providing aggregated short probe responses.

19 Claims, 8 Drawing Sheets

WIRELESS DISCOVERY USING A REDUCED TRAFFIC LOAD PROCESS

RELATED APPLICATIONS

This application claims the benefit of priority under 35 U.S.C. 119(e) to U.S. Provisional Patent Application Ser. No. 61/641,371, filed on May 2, 2012, which is incorporated herein by reference in its entirety.

BACKGROUND

Wireless Local Area Networks (WLAN) are very easy to set up and use, and have accordingly become very popular. WLANs connect computer networks via radio transmissions instead of traditional phone lines or cables. Benefits of these systems go well beyond getting rid of all the cables and wires. Campus networks can grow geographically larger while still retaining all their efficiency and speed. Additionally, cost savings can be realized when third-party circuit switched phone service are no longer needed, saving the cost of line rental and equipment upkeep. Finally, flexibility in campus network design increases significantly for the networking professional, while the network accessibility and usefulness increases for the individual users.

Wireless networks generally include multiple access points for wireless connectivity to multiple mobile stations. Such connectivity allows a mobile station to communicate with any number of types of devices within a network, for instance, a mainframe, a server, a networked printer, another mobile station, and the like. Mobile stations determine which network to join by scanning for available access points (AP). However, the scanning for available access points can cause a heavy load on the wireless medium.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

A broadcast domain is a network that connects devices that are capable of sending and receiving broadcast frames to and from one another. This domain is also referred to as a Layer 2 network. APs (Access Points) that are in the same broadcast domain and configured with the same service set identifier (SSID) are said to be in the same roaming domain. When in a roaming domain, a roaming user can maintain application connectivity within the roaming domain as long as its Layer 3 network address is maintained. However, when the user begins to roam across domains, more processes than just finding a new AP to communicate with are needed. The client has to perform a Layer 2 roam, including AP discovery, before beginning a Layer 3 roam.

Applications that are continuously running on mobile devices benefit from the high data rates of the IEEE 802.11 interface. Further, mobile users are constantly entering and leaving the coverage area of an existing extended service set (ESS). A mobile device performs a discovery process each time link setup is initiated, regardless of whether the mobile device is requesting an initial link setup of the mobile device. This calls for efficient mechanisms that scale with a high number of users simultaneously entering an ESS.

According to the IEEE 802.11 WLAN standard, active scanning is a procedure used by a STA (Station) to discover an AP by transmitting a probe request and decoding the shared wireless medium (WM) in an attempt to decode a response. Excessive air-time occupancy has been seen as a major drawback for using active scanning in a high-density Wi-Fi device environment. Thus, in a highly loaded WM, the active scanning procedure has the possibility to heavily load the WM due to both single and multiple probe requests. A single probe request may cause multiple probe responses from one or more APs. Each multiple probe request originating from a different STA calls for its own separate probe response without a method to unify the probe responses in a controlled, non-probabilistic manner. Moreover, active scanning occupies much air-time proportionally to the number of STAs multiplied by the number of the replying APs. Passive scanning doesn't cause air-time occupancy. However, passive scanning takes longer to discover a desired AP, resulting in a longer delay and higher power consumption, as the STAs have to wait for a cyclically transmitted message (e.g., a beacon, short beacon or the like).

Figure 1:
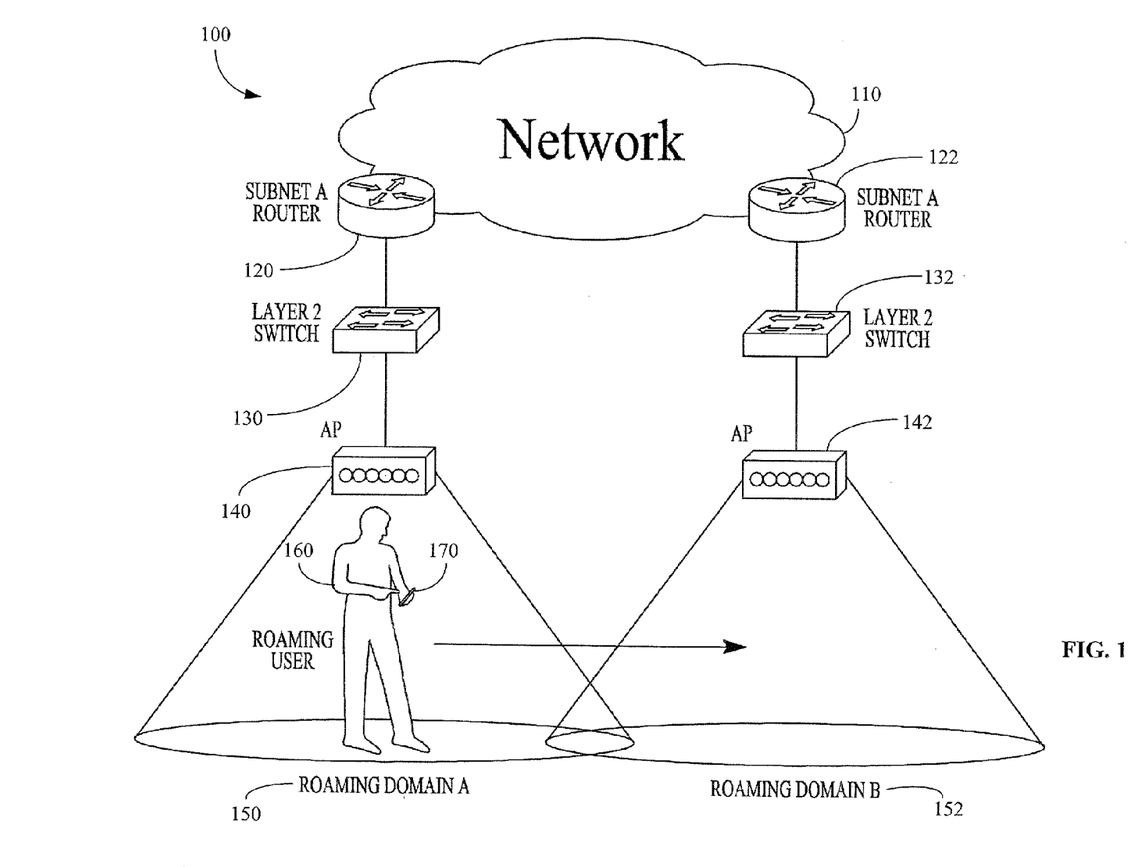
FIG. 1 illustrates roaming across roaming domains according to an embodiment.

FIG. 1 illustrates roaming across roaming domains in a wireless system 100 according to an embodiment. In FIG. 1, a network 110 includes two subnet routers, i.e., subnet A router 120 and subnet B router 122. Subnet A router 120 and Subnet B router 122 are coupled to a first Layer 2 switch 130 and second Layer 2 switch 132, respectively. A first access point (AP) 140 is coupled to the first Layer 2 switch 130 and a second AP 142 is coupled to the second Layer 2 switch 132. The first AP 140 is associated with roaming domain A 150 and the second AP 142 is associated with roaming domain B 152. A roaming user 160 is shown currently located within roaming domain A 150 and using STA 170. However, the roaming user 160 moves from AP 140 on Subnet A router 120 to AP 142 on Subnet B router 122. As a result, the client must change its Layer 3 network address to maintain Layer 3 connectivity on Subnet B.

An access process involves three steps: access point and network discovery, authentication and association. In the IEEE 802.11 standard, a wireless station (STA) 170 becomes aware of the existence of a Basic Service Set (BSS) through channel scanning. Channel scanning schemes contain two groups of methods: 1) STA passively seeking (i.e., receiving only in attempt to correctly decode) beacon transmissions from an access point (AP), and 2) STA actively probing (i.e., transmitting and attempting to decode response within a defined time) for the existence of an AP through a probe request/response exchange.

APs 140, 142 periodically broadcast beacon frames through available channels. Beacon frames may include the information associated with an AP 140, 142, such as maximum transmit power, and the channels to be used for the regulatory domain. Stations 170, which may be referred to as client devices, scan surrounding wireless networks to locate a compatible network. Active scanning or passive scanning may be used. Active scanning occurs when an STA 170 transmits a probe request and waits for a probe response from an AP (Access Point) which was able to decode and comply with the information enclosed in the probe request. In contrast, passive scanning occurs when an STA 170 attempts decoding of the shared WM (Wireless Medium) in an attempt to decode a broadcast message, e.g., a beacon, a measurement pilot or a probe response. As a result, while active scanning is optimized for power, passive scanning provides tower WM occupancy. Passive scanning network (NW) discovery can be achieved by decoding probe response and measurement pilot messages.

Figure 2:
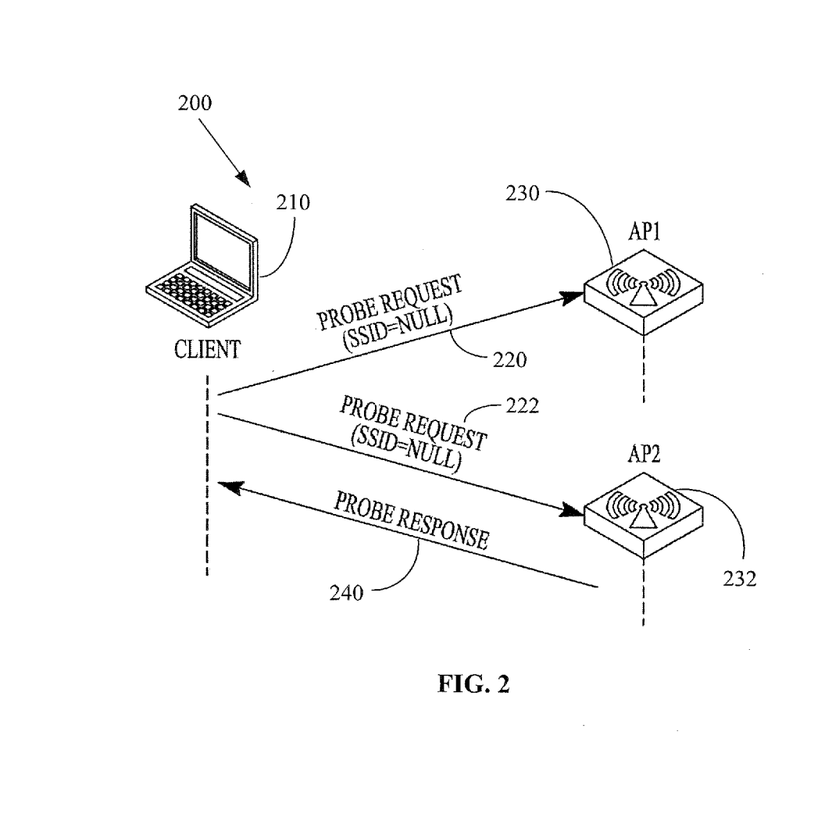
FIG. 2 illustrates active scanning wherein the same service set identifier (SSID) of the probe request is set to null according to an embodiment.

FIG. 2 illustrates active scanning 200 wherein the SSID of the probe request is set to null to discover an AP having the strongest signal according to an embodiment. The STA 210 prepares a list of channels and broadcasts a probe request frame on each of them to scan wireless networks. In FIG. 2, two probe requests 220, 222 are shown with a first probe request 220 being correctly decoded by AP1 230 and a second probe request 222 being received by AP2 232. APs that receive a probe request send a probe response. In FIG. 2, AP2 232 sends a probe response 240 to the STA 210. The STA 210 associates with the AP with the strongest signal. This active scanning 200 enables an STA 210 to know the AP identity and its operational parameters (e.g., AP load, PHY and MAC capabilities).

Figure 3:
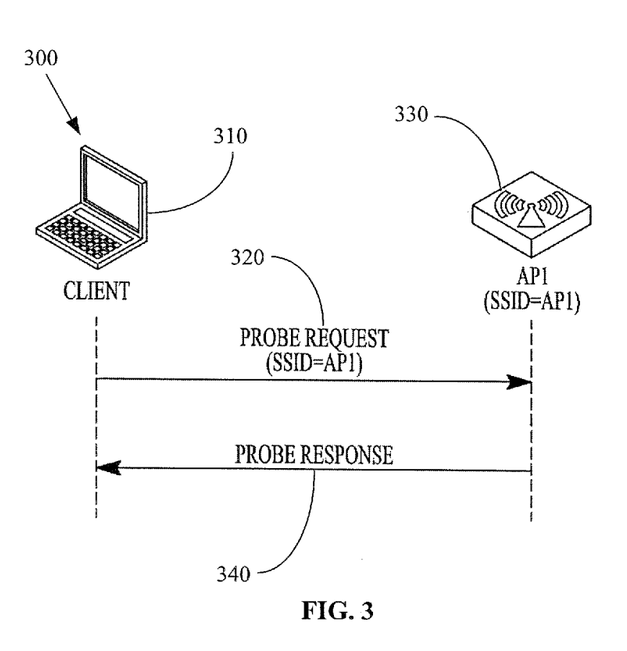
FIG. 3 shows active scanning wherein the probe request carries a specified SSID according to an embodiment.

FIG. 3 shows active scanning 300 wherein the probe request carries a specified SSID according to an embodiment. The client 310 unicasts a probe request 320 to AP1 330 containing the specified SSID. When AP1 330 receives the probe request 320, AP1 330 sends a probe response 340 to the client 310. This active scanning 300 enables a client 310 to identify existence of the specified wireless network, i.e., AP1 330, in its current location and channel conditions.

Figure 4:
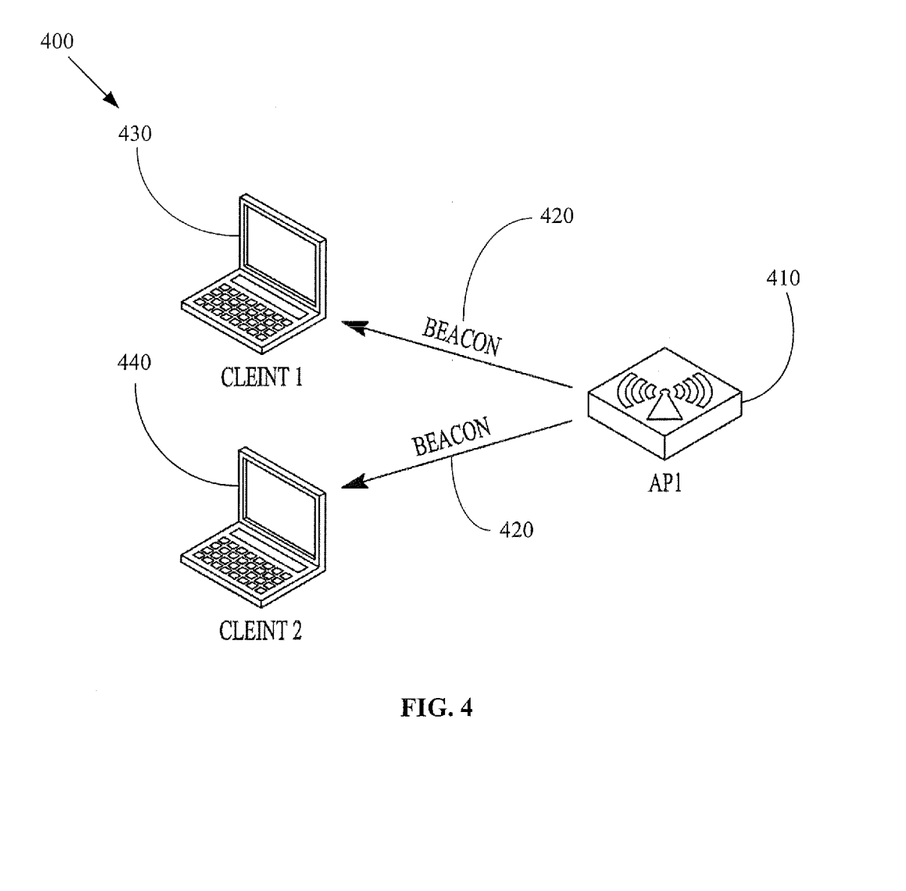
FIG. 4 illustrates an example of passive scanning.

FIG. 4 illustrates passive scanning 400 according to an embodiment. In FIG. 4, AP1 410 broadcasts a beacon 420 that is received by clients within range, e.g., Client 1 430 and Client 2 440. Passive scanning is used by clients 430, 440 to discover surrounding wireless networks by listening to the beacon frames periodically sent by AP1 410, or by another AP. Clients 430, 440 prepare a list of channels and listen to beacons on each of these channels.

However, active scanning occupies much air-time proportionally to the number of STAs. Real conditions are much more severe because the responding AP is not the only AP sending and receiving data using the WM. Passive scanning doesn't cause air-time occupancy, but takes a longer time to discover a desired AP.

Figure 5:
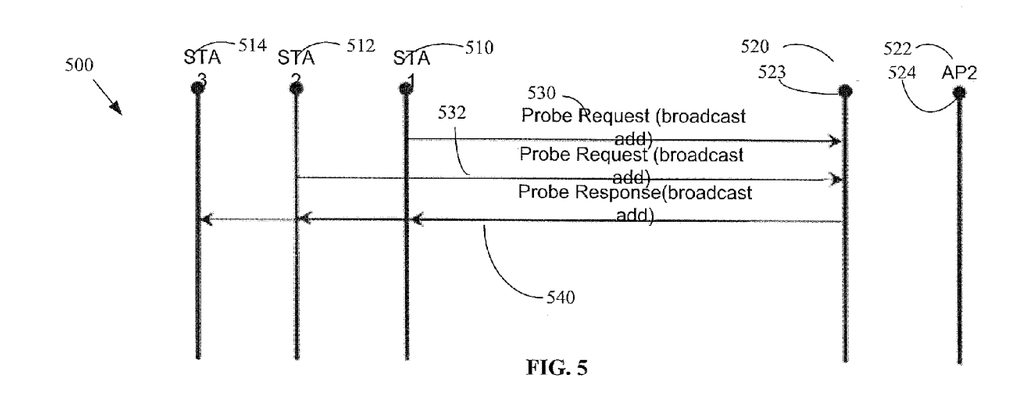
FIG. 5 illustrates a response to multiple probe requests using a single probe response.

FIG. 5 illustrates probe responses to multiple probe requests being sent using a single probe response in a wireless system 500 according to an embodiment. In FIG. 5, a plurality of wireless nodes may include a plurality of wireless access points (AP) AP1 520, AP2 522 and a plurality of wireless stations STA1 510, STA2 512, STA3 514. AP1 520 and AP2 522 include an antenna 523, 524, respectively, for receiving and transmitting wireless signals. STA1 510 and STA2 512 each send a probe request 530, 532 to AP1 520. AP1 520 responds to the probe requests 530, 532 by unifying probe responses into a single probe response 540. However, unifying probe responses to a single probe response 540 is susceptible to the scheduling of probe requests because the probe response is supposed to appear within a narrow transmission window. This narrow window needs to comply with the scheduling window of each and every one of the Probe Requests answered by the probe response.

Figure 6:
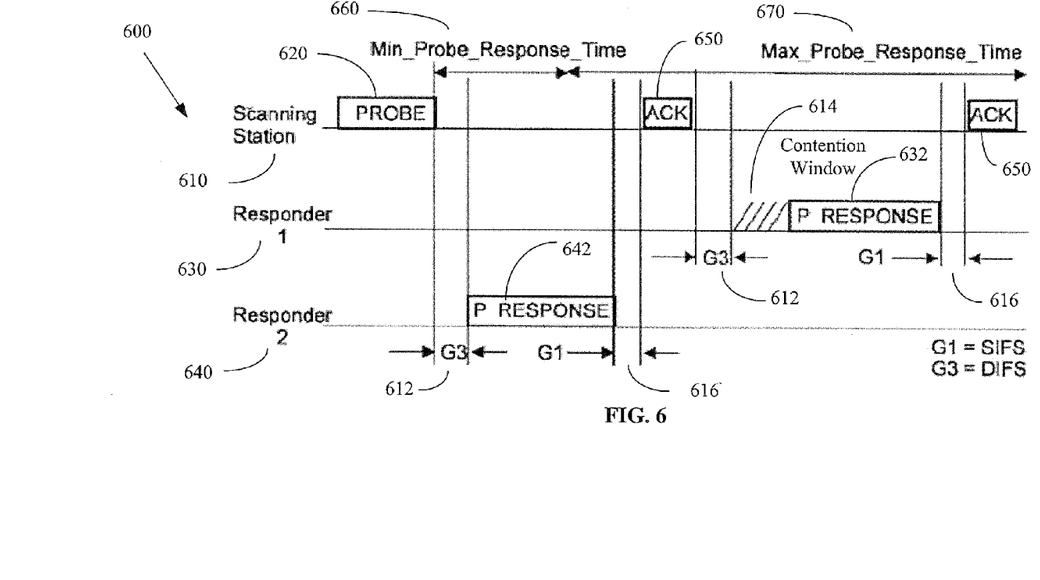
FIG. 6 shows the receive window for a probe response.

FIG. 6 shows the receive window 600 for a probe response according to an embodiment. In FIG. 6, a scanning station STA 610 is shown sending a probe request frame 620 according to an embodiment. Scanning STA 610 moves to a particular channel and then waits until a Probe Delay timer expires. Scanning STA 610 then senses the medium for the absence of transmissions by other STAs for a minimum of distributed coordination function (DCF) interframe space (DIFS) time period 612. The DIFS time period 612 is used by transmitting devices to transmit data exchange frames and management frames. Management frames include such frames as probe request frames 620 and probe response frames 632, 642 used for communications handshakes between a mobile station, e.g., scanning STA 610, and an access point, e.g., responder 1 630 and responder 2 640. If the medium remains idle during the DIFS time period 612, the scanning STA 610 picks a backoff interval in the range of (0, CW), where CW denotes a contention window 614. CW 614 is initially set to be a preset minimum contention window size, $CW_{min}$, and doubled each time a retransmission occurs, until it reaches the preset maximum contention window. A short interframe space (SIFS) 616 is employed when a transmitting device, e.g., scanning STA 610, has seized a channel on the wireless medium and needs to keep the channel for the duration of the frame exchange procedure to be performed. One example is the acknowledgement procedure where the acknowledgment frame 650 (or "ACK frame") transmission duration is preserved by the originator of the preceding frame.

The scanning STA 610 accesses a medium and transmits a probe request frame 620. Upon listening to the probe request frame 620 of the scanning STA 610, a responder 1 630 transmits a probe response frame 632 to the scanning STA 610 and a responder 2 640 transmits a probe response frame 642 to the scanning STA 610. Here, responder 1 630 and responder 2 640 may be an AP. The probe response frame 632 of the responder 1 630 is transmitted based on the DCF rule of IEEE 802.11 standard. Accordingly, the probe response frame 632 is transmitted through the process of contention window 614.

Min_Probe_Response_Time 660 is a minimum response time. If a correct frame (e.g., other response) has been received before the minimum response time lapses, responses are awaited until Max_Probe_Response_Time 670 expires. If not, a scanning STA 610 may change channels when a short probe response is not received during the set response time. When a scanning STA 610 receives a probe response, the scanning STA 610 may act on a reference provided therein. In FIG. 6, for example, if no other probe response is received until the Max_Probe_Response_Time 670 expires for the two probe response frames 642, 632, the scanning STA 610 determines that there are two APs in the channel based on receipt of the two probe response frames 632, 642. However, extending the receive window by the Min_Probe_response_Time 660 and Max_Probe_Response_Time 670 is limited due to a negative effect over the mobile device containing the scanning STA 610.

The wireless stations and wireless access points according to embodiments described herein are configured to support wireless discovery using a reduced traffic load process. The reduced traffic load process includes providing aggregated short probe responses.

Figure 7:
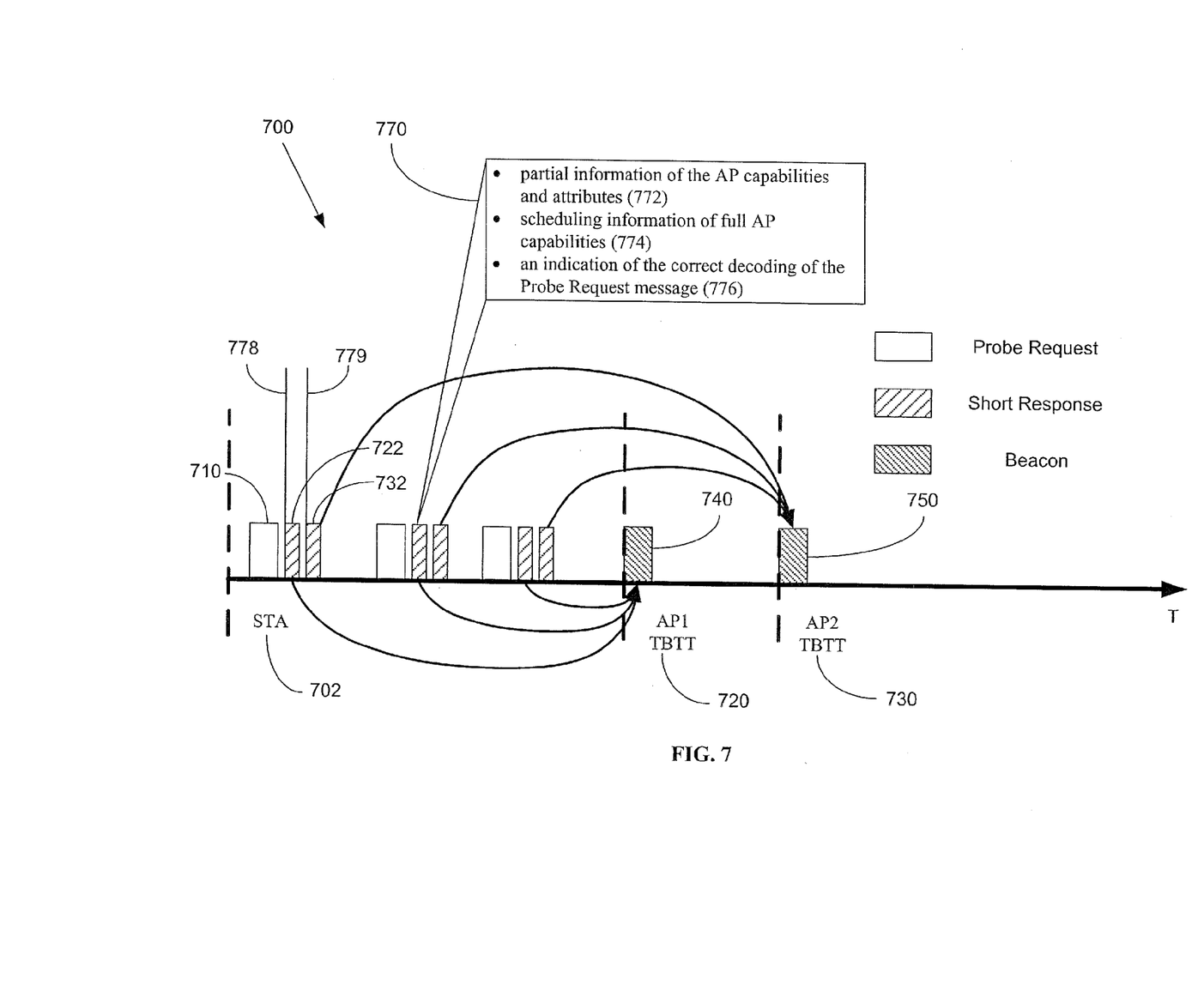
FIG. 7 illustrates probe response aggregation using short response and beacon pointer according to an embodiment.

FIG. 7 illustrates the use of short probe response aggregation 700 according to an embodiment. In FIG. 7, a probe request 710 is responded by multiple APs, AP1 720, AP2 730, each using its own short probe responses 722, 732. The short probe responses 722, 732, e.g., measurement pilots, short beacon or FILS (Fast Initial Link Setup) discovery frame, may be used to point to nearest beacon 740, 750, respectively, or to more distant beacons depending on the discretion of the APs, AP1 720, AP2 730. The short probe responses 722, 732 provide the timer synchronization function (TSF) clock, the target beacon transmission time (TBTT) and the beacon interval that provides the scheduling information on not only the nearest beacon 740 to be transmitted, but also to future instances of the beacon. The short probe responses 722, 732 provide only information pertinent to a STA for performing link setup with an access point while reducing traffic overhead to the wireless medium. The information 770 only includes partial information of the AP capabilities and attributes 772, scheduling information and/or reference to full wireless AP capabilities 774, and an indication of the correct decoding of the probe request 776. The scheduling information and/or reference to full wireless AP capabilities 774 may include multiple instances of the probe responses providing full AP capabilities provided in a schedule. A decision on the reference to the scheduling of the full AP capabilities may be derived from any combination of the entity of the STA performing the probe request, AP filtering information, the preferences of the STA enclosed in the probe request and the number of STAs attempting active scanning at a given time interval to reduce the maximum number of STAs with an outstanding association procedure. The response windows 778, 779 for the short probe responses 722, 732 are shorter than the response window used for a full AP capabilities message as the short probe responses 722, 732 can be constructed in advanced or dynamic fields within it (e.g., the Timing Synchronization Field (TFS)). The short probe response 722, 732 may be unicast, multicast or broadcast or may use OUI (Organizational Unique Identifiers), i.e., special MAC allocated address. The short probe responses 722, 732 may also indicate the correct reception of probe requests 710 by referring to it. AP1 720 and AP2 730 responding with the short probe responses 722, 732 use the current virtual and/or physical CSMA/CA to contend on resources to transmit the short probe responses 722, 732.

Thus, the probe request 710 is responded to by transmitting short probe responses 722, 732 by AP1 720 and AP2 730, respectively, to indicate the link coverage and correct reception of the probe request 710. The short probe responses 722, 732 may be an ACK like message, a beacon, a short beacon or a measurement pilot, or a FILS Discovery Frame (FD) to reduce the associated WM usage. In addition, the short probe responses 722, 732 include the scheduling information of a message providing the complete information of AP1 720 and AP2 730, respectively, i.e., scheduling information of beacons 740, 750, respectively and their associated scheduling cycle with a certain accuracy. Beacons 740, 750 providing the complete information may be full beacons, mini beacons, measurement pilots or FD frame. The short probe responses 722, 732 may additionally include the scheduling of repeated full information message transmission thereby increasing the decoding resiliency of complete information and enabling smart scheduling of multiple channel message decoding using future instances of the full message transmission rather than the nearest.

As shown in FIG. 7, multiple short probe responses 722, 732 may be pointed to the same full message, thereby reducing the WM occupancy. AP1 720 and AP2 730 may also use this scheme to prioritize the entry of certain STAs over other STAs by pointing to nearby or distant full message respectively. Due to the use of short probe responses 722, 732, which include minimal information and can be pre-constructed, the receive window of the STA 702 following the probe request 710 may be shortened, thereby improving the PWR consumption during the NW discovery phase.

Figure 8:
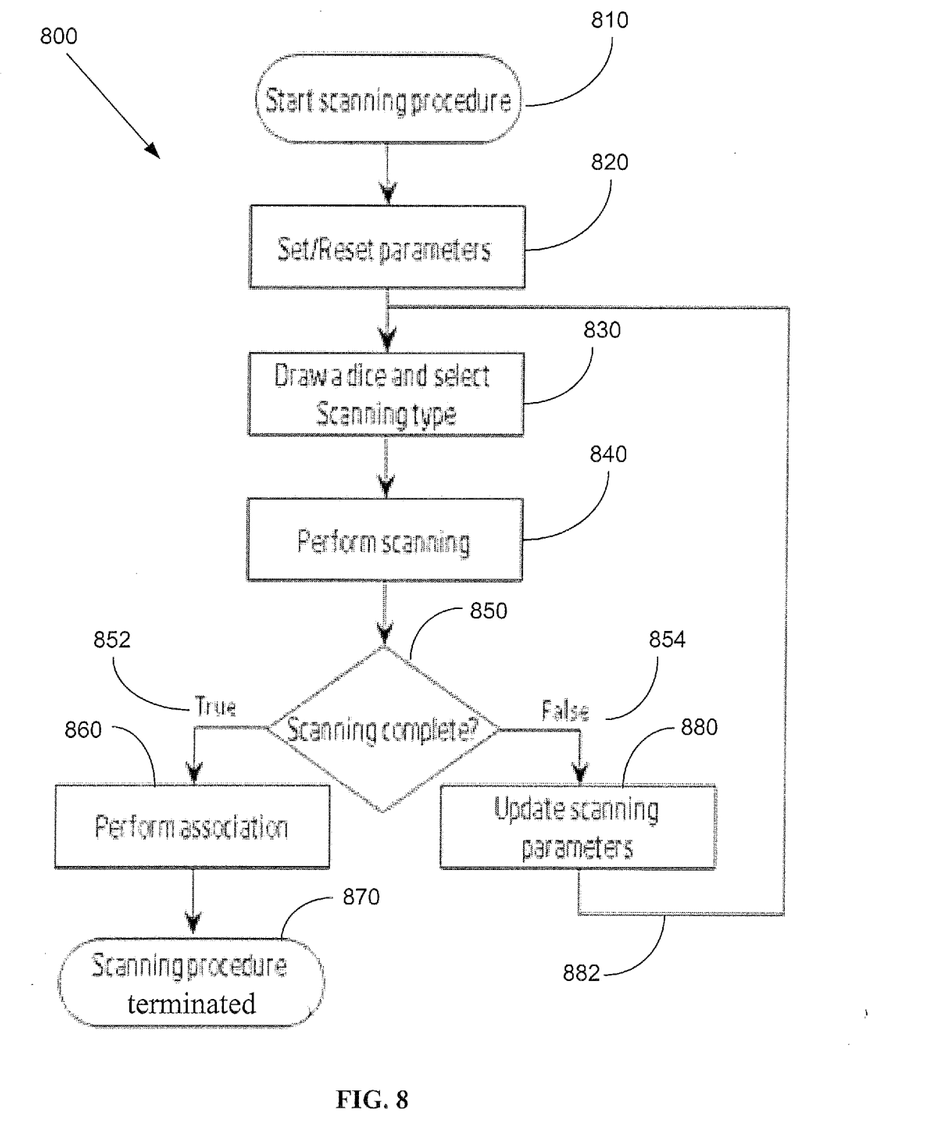
FIG. 8 illustrates a flow chart for passive scanning according to an embodiment.

FIG. 8 is a flowchart for mixed active and passive scanning 800 according to an embodiment. A mixture of STAs performing passive and active scanning is provided using a set of predefined roles, for example, by having STAs draw dice using pre-defined probability characteristics. In FIG. 8, the scanning procedure is initiated at operation 810. The scanning procedure allows the STA to select probability function parameters at operation 820. The STA may be scanning for the first time and setting probability function parameters accordingly, or, if not for the first time, the STA may reset its probability function parameters. In addition, the probability function behavior may be fixed so that the behavior is independent of the past history. Thus, the probability function parameters may be set depending on whether this is the first scanning since power up or whether other scanning has been performed in the near past. Thus, the setting of the probability function parameters may be based on a random probability distribution that is biased according to the pre-defined probability characteristics.

The STA draws dice at operation 830 with the results being based on the probability function parameters and selects the scanning type indicated. The result of the draw dictates whether the STA attempts NW discovery using an active scanning procedure or a passive scanning procedure. The probability characteristics may be fixed or variable. Further, the probability of selecting active or passive scanning may be dependent on events. Such events may be based on frames received by the STA over the WM in a given time interval. The probability function may also include a bias increasing the probability of passive or active scanning procedure selection.

The STA performs scanning according to the indicated scanning type at operation 840. At operation 850, a determination is made as to whether the scanning is complete. If the scanning is complete (operation 852), i.e., an adequate AP for association is found, the STA performs an association procedure at operation 860. The process is then terminated operation 870. Otherwise (operation 854), the STA updates the probability function parameters at operation 880, i.e., updates the scanning parameters, and then returns (operation 882) to operation 830 to draw dice again, and according to the scanning type, performs the scanning attempt again, e.g., minimal duration between successive active scanning attempts.

Figure 9:
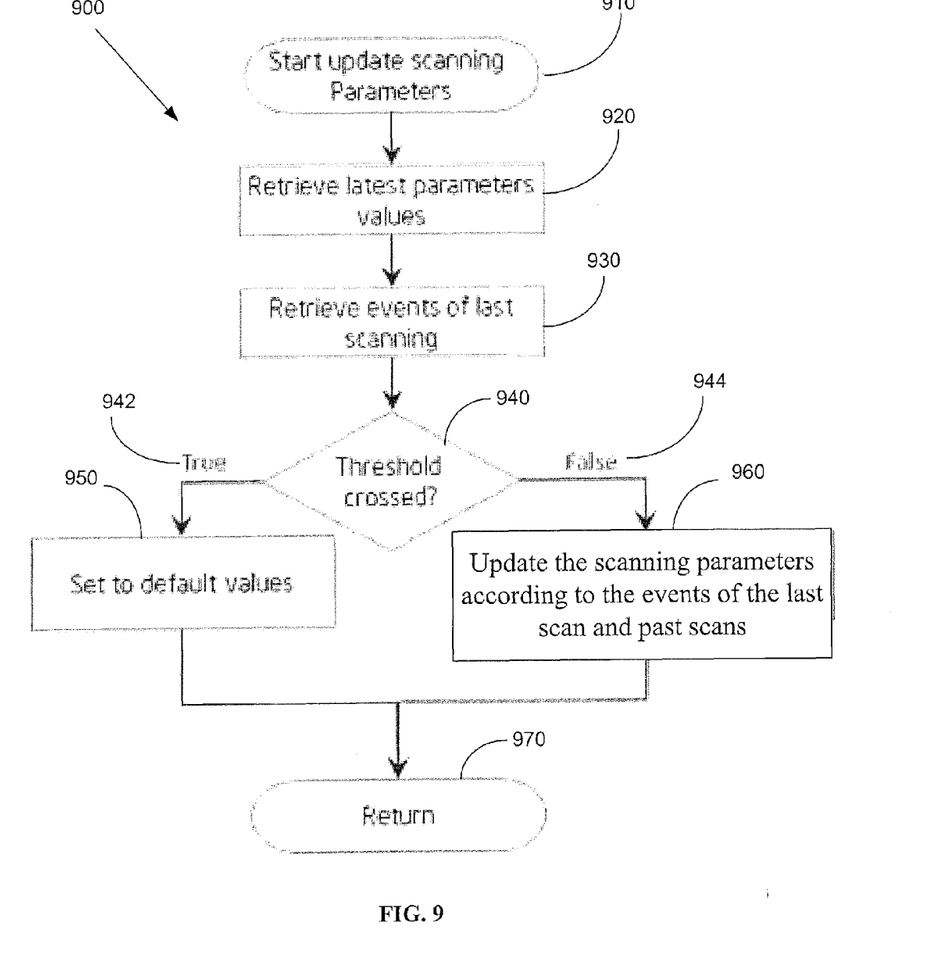
FIG. 9 illustrates a flowchart for updating the probability function parameters according to an embodiment.

FIG. 9 is a flowchart 900 for updating the probability function parameters according to an embodiment. In FIG. 9, the updating of the scanning parameters is initiated at operation 910. The latest parameter values are retrieved at operation 920. The events of the last scanning are retrieved at operation 930. A determination is made whether a threshold has been crossed at operation 940. If the threshold has been crossed (operation 942), the parameters are set as default values at operation 950. Otherwise (operation 944), the scanning parameters are updated according to the events of the last scan and past scans at operation 960. The process then returns to the mixed scanning procedure to draw dice at operation 970. As a default value, previous parameters may be overridden so that a STA may select active or passive scanning at its own discretion upon detection of certain predetermined conditions. For example, a predetermined condition may include performing wireless access discovery for emergency services such as 911 services, or in response to other network events.

The update of the scanning parameters may be used to level the active and passive scanning and to identify and subside the WM occupancy effect of active scanning in some situations where the WM is loaded. The updates may be dependent on one or more events in any combination. Such events may include the duration from loss of the recent association; the level of WM occupancy or traffic measured over the shared channel by an AP or STA; the number of AP identified in the last scanning procedure either via beacons, probe response, measurement pilots, and/or mini beacons; the number of probe requests identified in given time interval; and an indication by a received frame in the frame header for a specific type of scanning allowed or disallowed. The probability function may also be defined such that it leans towards passive or active scanning, i.e., be modified to include a bias. The probability function may also come into action, i.e., be used or overridden, in some situations depending on the events identified over the WM. e.g., no AP being identified for a predetermined duration.

Figure 10:
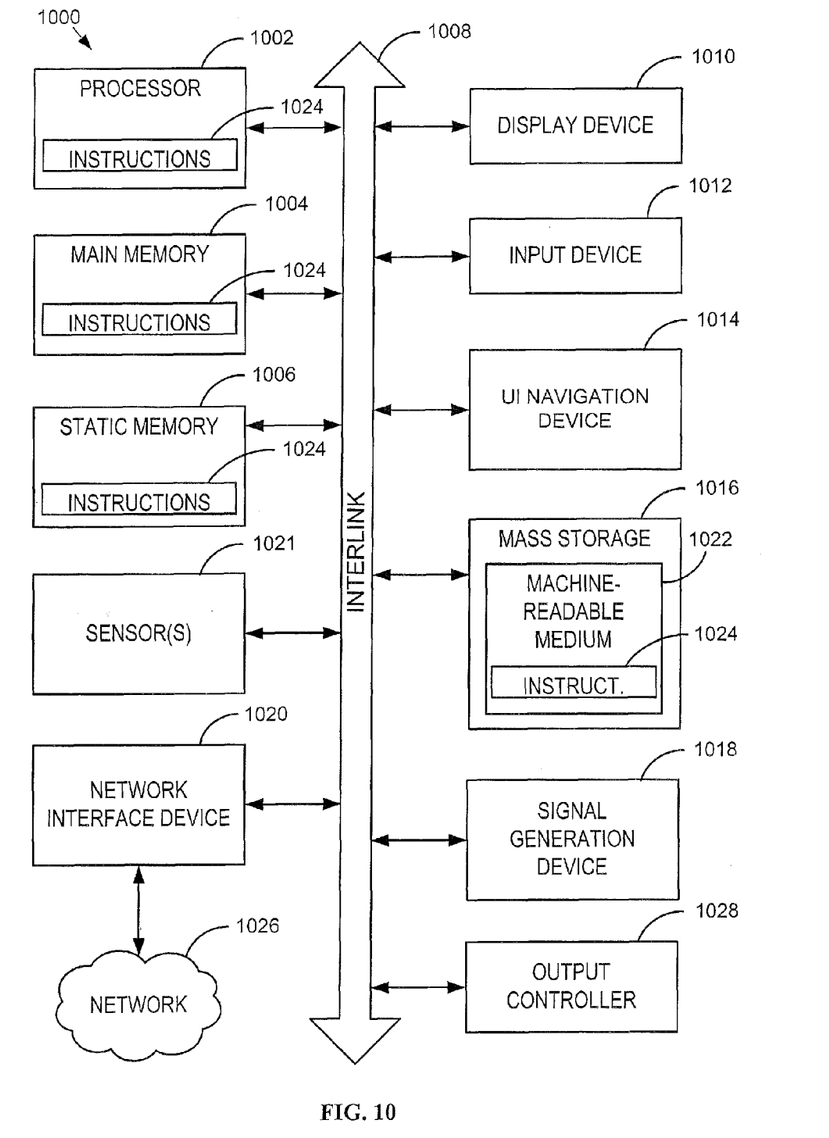
FIG. 10 illustrates a block diagram of an example machine upon which any one or more of the techniques (e.g., methodologies) discussed herein may perform.

FIG. 10 illustrates a block diagram of an example machine 1000 upon which any one or more of the techniques (e.g., methodologies) discussed herein may perform. In alternative embodiments, the machine 1000 may operate in a standalone mode or may be connected (e.g., networked) to other machines in a network mode. In a networked deployment, the machine 1000 may operate in the capacity of a server machine, a client machine, or both in server-client network environments. In an example, the machine 1000 may act as a peer machine in peer-to-peer (P2P) (or other distributed) network environment. In another example, the machine 1000 may acts as a client (STA) or an AP during a link setup when domain crossing occurs.

The machine 1000 may further be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine.

Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations. Examples as described herein may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 1000 may include a hardware processor 1002 (e.g., a central processing unit (CPU), a graphics processing unit (GPU), a hardware processor core, or any combination thereof), a main memory 1004 and a static memory 1006, some or all of which may communicate with each other via an interlink (e.g., bus) 1008. The machine 1000 may further include a display unit 1010, an alphanumeric input device 1012 (e.g., a keyboard), and a user interface (UI) navigation device 1014 (e.g., a mouse). In an example, the display unit 1010, input device 1012 and UI navigation device 1014 may be a touch screen display. The machine 1000 may additionally include a storage device (e.g., drive unit) 1016, a signal generation device 1018 (e.g., a speaker), a network interface device 1020, and one or more sensors 1021, such as a global positioning system (GPS) sensor, compass, accelerometer, or other sensor. The machine 1000 may include an output controller 1028, such as a serial (e.g., universal serial bus (USB), parallel, or other wired or wireless (e.g., infrared (IR)) connection to communicate or control one or more peripheral devices (e.g., a printer, card reader, etc.).

The storage device 1016 may include a machine-readable medium 1022 on which is stored one or more sets of data structures or instructions 1024 (e.g., software) embodying or utilized by any one or more of the techniques or functions described herein. The instructions 1024 may also reside, completely or at least partially, within the main memory 1004, within static memory 1006, or within the hardware processor 1002 during execution thereof by the machine 1000. In an example, one or any combination of the hardware processor 1002, the main memory 1004, the static memory 1006, or the storage device 1016 may constitute machine-readable media.

While the machine-readable medium 1022 is illustrated as a single medium, the term "machine readable medium" may include a single medium or multiple media (e.g., a centralized or distributed database, and/or associated caches and servers) that are configured to store the one or more instructions 1024.

The term "machine readable medium" may include any medium that is capable of storing, encoding, or carrying instructions for execution by the machine 1000 and that cause the machine 1000 to perform any one or more of the techniques of the present disclosure, or that is capable of storing, encoding or carrying data structures used by or associated with such instructions. Non-limiting machine-readable medium examples may include solid-state memories, and optical and magnetic media. In an example, a massed machine-readable medium comprises a machine-readable medium with a plurality of particles having resting mass. Specific examples of massed machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices;

magnetic disks, such as internal hard disks and removable disks; magneto-optical disks; and CD-ROM and DVD-ROM disks.

The instructions 1024 may further be configured for transmission and reception over a communications network 1026 using a transmission medium via the network interface device 1020 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g. the Internet), mobile telephone networks (e.g., channel access methods including Code Division Multiple Access (CDMA), Time-division multiple access (TDMA), Frequency-division multiple access (FDMA), and Orthogonal Frequency Division Multiple Access (OFDMA); and cellular networks such as Global System for Mobile Communications (GSM), Universal Mobile Telecommunications System (UMTS), CDMA 2000 1x* standards and Long Term Evolution (LTE)); Plain Old Telephone (POTS) networks; and wireless data networks (e.g., Institute of Electrical and Electronics Engineers (IEEE) 802 family of standards including IEEE 802.11 standards (Wi-Fi®), IEEE 802.16 standards (WiMax®) and others) and peer-to-peer (P2P) networks; or other protocols now known or later developed.

For example, the network interface device 1020 may include one or more physical jacks (e.g., Ethernet, coaxial, or phone jacks) or one or more antennas to connect to the communications network 1026. In an example, the network interface device 1020 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1000, and includes digital or analog communications signals or other intangible medium to facilitate communication of such software.

The above detailed description includes references to the accompanying drawings, which form a part of the detailed description. The drawings show, by way of illustration, specific embodiments in which the inventive subject matter can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second." and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is to allow the reader to quickly ascertain the nature of the technical disclosure, for example, to comply with 37 C.F.R. §1.72(b). It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the present inventive subject matter should be determined with reference to the appended claims, along with the full scope of equivalents to which such claims are entitled.

What is claimed is:

1. A wireless station, comprising:
   a transceiver to transmit and receive wireless signals via a wireless medium; and
   a processor arranged to set parameters associated with a probability function, and to randomly identify a scanning type selected from active scanning or passive scanning based on the parameters associated with the probability function set by the processor, to cause the transceiver to scan based on the scanning type randomly identified.

2. The wireless station of claim 1, wherein the probability function is fixed.

3. The wireless station of claim 1, wherein the processor, upon detection of a predetermined condition, overrides the probability function to provide discretion to the processor to select the scanning type.

4. The wireless station of claim 3, wherein the predetermined condition comprises wireless access discovery for emergency services.

5. The wireless station of claim 1, wherein the parameters of the probability function are dependent on network events.

6. The wireless station of claim 5, wherein the network events comprise one selected from a group consisting of a probe request, a probe response, a beacon, a measurement pilot, and a short beacon.

7. The wireless station of claim 1, wherein the probability function includes a bias to increase a probability of selecting one of passive scanning or active scanning.

8. The wireless station of claim 1, wherein the processor is arranged to switch channels when a short response is not received before a minimum response time lapses.

9. The wireless station of claim 1, wherein the processor is arranged to act on a reference provided in a received short probe response.

10. A system, comprising:
    a memory arranged to store data thereon; and
    a processor, coupled to the memory, the processor arranged to access the memory and to set parameters associated with a probability function, to randomly identify a scanning type selected from active scanning or passive scanning based on the parameters associated with the probability function set b the processor, and to scan based on the scanning type randomly identified.

11. The system of claim 10, wherein the probability function is fixed.

12. The system of claim 10, wherein the processor, upon detection of a predetermined condition, is arranged to override the probability function to provide discretion to the processor to select the scanning type.

13. The system of claim 10, wherein the probability function includes a bias to increase a probability of selecting one of passive scanning or active scanning.

14. The system of claim 10, wherein the processor is arranged to switch channels when a short response is not received before a minimum response time lapses.

15. The system of claim 10, wherein the processor is arranged to act on a reference provided in a received short probe response.

16. A method for reducing traffic load over a wireless medium due to wireless access point discovery, comprising:
setting parameters associated with a probability function;
randomly identifying a scanning type selected from active scanning or passive scanning based on the set parameters associated with the probability function; and
scanning based on the scanning type randomly identified.

17. The method of claim 16, further comprising configuring at least one wireless station and at least one wireless access point to support wireless discovery using a reduced traffic load process, generating a short probe response at one of a plurality of wireless access points in response to receipt of a probe request from the at least one wireless station, wherein the short probe response provides only requisite information to the at least one wireless station for performing link setup to reduce the traffic load on the wireless medium, and transmitting the short probe response to the at least one wireless station.

18. The method of claim 17, wherein the generating the short probe response comprises generating the short probe response with only partial information of capabilities and attributes of one of the plurality of wireless access points, scheduling information of full wireless access point capabilities and an indication of correct decoding of the probe request.

19. The method of claim 17, wherein the configuring at least one of the at least one wireless station and the at least one wireless access point to support wireless discovery using the reduced traffic load process comprises setting parameters associated with a probability function at the at least one wireless station, randomly identifying a scanning type based on the set parameters associated with the probability function, and performing scanning based on the randomly identified scanning type.

* * * * *